(12) United States Patent
Hessler et al.

(10) Patent No.: US 11,323,160 B2
(45) Date of Patent: May 3, 2022

(54) LINK ADAPTATION CORRECTION FOR LOW LATENCY MU-MIMO

(71) Applicant: Telefonaktiebolaget LM Ericsson (publ), Stockholm (SE)

(72) Inventors: Martin Hessler, Linköping (SE); Robert Baldemair, Solna (SE); Jonas Fröberg Olsson, Ljungsbro (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 86 days.

(21) Appl. No.: 16/969,454

(22) PCT Filed: Feb. 14, 2018

(86) PCT No.: PCT/EP2018/053640
§ 371 (c)(1),
(2) Date: Aug. 12, 2020

(87) PCT Pub. No.: WO2019/158193
PCT Pub. Date: Aug. 22, 2019

(65) Prior Publication Data
US 2020/0373973 A1 Nov. 26, 2020

(51) Int. Cl.
H04B 7/0452 (2017.01)
H04L 1/00 (2006.01)
(Continued)

(52) U.S. Cl.
CPC ......... *H04B 7/0452* (2013.01); *H04L 1/0003* (2013.01); *H04L 1/0009* (2013.01);
(Continued)

(58) Field of Classification Search
CPC ... H04B 7/0452; H04L 1/0003; H04L 1/0009; H04L 1/0026; H04W 52/08;
(Continued)

(56) References Cited

U.S. PATENT DOCUMENTS 6,587,696 B1    7/2003  Ma et al.
2012/0093253 A1 4/2012  Park et al.
(Continued)

OTHER PUBLICATIONS

International Search Report and Written Opinion issued in International Application No. PCT/EP2018/053640 dated Nov. 16, 2018 (11 pages).

(Continued)

Primary Examiner — Jackie Zuniga Abad
(74) Attorney, Agent, or Firm — Christopher & Weisberg, P.A.

(57) ABSTRACT

A method of operating a communication node according to some embodiments includes generating (400) a link adaptation for a downlink transmission to a plurality of UEs based on first channel state information, generating (402) estimated SINR values for the UEs based on the link adaptation, obtaining (404) new channel state information for the UEs, generating (406) updated estimated SINR value based on the new channel state information and the link adaptation, modifying (408) a power allocation for the UEs based on the updated estimated SINR, and transmitting (410) data to the UEs using the link adaptation and the modified power allocation.

18 Claims, 11 Drawing Sheets

(51) Int. Cl.
　　　*H04W 52/08*　　　(2009.01)
　　　*H04W 52/14*　　　(2009.01)
　　　*H04W 52/24*　　　(2009.01)
　　　*H04W 52/34*　　　(2009.01)
　　　*H04W 52/42*　　　(2009.01)

(52) U.S. Cl.
　　　CPC .......... *H04L 1/0018* (2013.01); *H04L 1/0026* (2013.01); *H04W 52/08* (2013.01); *H04W 52/143* (2013.01); *H04W 52/241* (2013.01); *H04W 52/346* (2013.01); *H04W 52/42* (2013.01)

(58) Field of Classification Search
　　　CPC ............. H04W 52/143; H04W 52/241; H04W 52/346; H04W 52/42
　　　See application file for complete search history.

(56) References Cited

U.S. PATENT DOCUMENTS

| | | | | |
|---|---|---|---|---|
| 2015/0131584 | A1* | 5/2015 | Li | H04W 24/08 370/329 |
| 2017/0331577 | A1* | 11/2017 | Parkvall | H04L 5/0053 |
| 2020/0007270 | A1* | 1/2020 | Wikstrom | H04L 1/0009 |
| 2020/0036457 | A1* | 1/2020 | Yum | H04L 5/0023 |

OTHER PUBLICATIONS

Liu, An et al., "Stochastic Successive Convex Optimization for Two-timescale Hybrid Precoding in Massive MIMO", ARXIV.org, Cornell University Library, Jan. 25, 2018 (13 pages).

\* cited by examiner

US 11,323,160 B2

LINK ADAPTATION CORRECTION FOR LOW LATENCY MU-MIMO

CROSS REFERENCE TO RELATED APPLICATION(S)

This application is a 35 U.S.C. § 371 National Stage of International Patent Application No. 371 of PCT/EP2018/053640, filed Feb. 14, 2018, designating the United States.

BACKGROUND

Mobile data traffic is growing rapidly due to the enormous success of smart phones, tablets and other data traffic appliances. To handle the increased mobile data traffic, it is desirable to increase the data rate of transmissions in mobile communication networks, also referred to as mobile networks. One way for increasing the data rate in mobile networks has been simply to increase the transmission bandwidth of the network. However, the portion of the electromagnetic spectrum that is available to mobile networks has become scarce due to the increased number of wireless access systems that have been deployed. Thus, a challenge for future wireless access systems is to find alternative solutions to meet high demands for increased data rates.

Another way of handling increased wireless data traffic is to deploy more base stations (BS) in the network, and thereby increase the density of the network. However, adding more base stations to a network may increase interference levels and/or lead to increased deployment costs.

Another option for increasing system capacity that may be simpler in terms of deployment costs is to introduce large antenna arrays at the base station. A base station that has a large number of transmit antennas, can schedule multiple terminals simultaneously using the same time/frequency resources by employing simple linear processing techniques, such as maximum-ratio transmission (MRT) or zero-forcing (ZF) in the downlink, and maximum-ratio combining (MRC) or ZF in the uplink. This is often referred to as multi-user (MU) multiple-input-multiple-output (MIMO), and is abbreviated as MU-MIMO. When very large numbers of antennas are employed, such systems may be referred to as very large MIMO, or VL-MIMO.

A base station uses channel state information (CSI), that is, information about the state of the channels between the BS and the User Equipments (UEs), to implement the linear processing techniques needed for VL-MIMO. Thus, one challenge in deploying VL-MIMO is enabling the base station to acquire accurate channel state information. In order to gain the benefit of having a large number of transmit antennas, it is important that the transmitter have access to accurate CSI so that an accurate precoding vector can be selected/calculated. A precoding vector or matrix, or precoder, is a vector (or matrix) that is used to encode signals for transmission over multiple antennas in a MU-MIMO system.

Various precoder designs have been proposed for use in VL-MIMO systems. In particular, the performance of different precoders has been studied. In addition, some novel schemes for designing a precoder with imperfect and/or partial CSI knowledge have been proposed.

In practice, one approach that has been proposed for the New Radio (NR) standard is to utilize an improved Sounding Reference Signal (SRS) design to acquire reciprocity-based channel state information about the downlink (DL) for precoder calculations. These improvements are intended to improve MU multiplexing, to improve link-budget, and to enable dynamic SRS transmissions that are triggered in Downlink Control Information (DCI).

For a quantitative understanding of how inaccurate CSI can affect the performance of a communication system, consider a multiple-input-single-output (MISO) system with M=100 input antennas and assume maximum ratio transmission. Mathematically, this can be expressed by:

$$y = \sqrt{P}hwq + e, \quad [1]$$

where P is the transmitted power, h denotes the M×1 channel vector, w is the 1×M precoding vector, q is the unit-energy transmitted symbol, e is zero-mean additive white Gaussian noise with variance $\sigma^2$, and y is the output. An ideal Maximum-Ratio Transmitter (MRT) precoding vector w is given as:

$$w = \frac{h^*}{\|h\|} \quad [2]$$

Precoding transmit signals using this vector results in an average received signal-to-noise-ratio (SNR) that scales in proportion to the number of input antennas (M). In Equation [2], the superscript * refers to the conjugate transpose, or Hermitian transpose, of a vector or a matrix. Mathematically, for the m×n matrix A, A* is an n×m matrix with $A_{i,j}^* = \overline{A_{j,i}}$. Moreover, $A^T$ denotes the transpose of the matrix A, and $A^+$ denotes the pseudoinverse of the matrix A defined as $A^+ = A^*(AA^*)^{-1}$.

In practice, the transmission characteristics h of the channel might change from the time of measurement to the time that the actual transmission occurs. As will be appreciated, a change in the transmission characteristics h of the channel renders the channel vector w, determined using the previous transmission characteristics h, to be non-optimal.

The effect of a change in the transmission characteristics h of the channel may be modelled statistically by assuming that the channel correlation between the measurement and the transmission is given by 1−ρ, where, ρ=0 means that the channel remains the same between measurement and transmission and ρ=1 means that the channels are uncorrelated between measurement and the transmission.

FIG. 1 is a plot showing the effect on the signal to noise ratio (SNR) of a transmission caused by a change in the channel correlation. In FIG. 1, the transmitted SNR is set to 1, i.e., $$\frac{P}{\sigma^2} = 1$$

and it is assumed that a fast Rayleigh fading scenario occurs where the elements of h are circularly symmetric Gaussian random variables with mean zero and variance 1. The precoding vector w is calculated using MRT as shown above. As can be seen in FIG. 1, as the channel correlation decreases (i.e., as ρ increases) the SNR of the transmission falls accordingly. In particular, for ρ=0.15, the received SNR already decreases by half, which illustrates how sensitive the MRT approach is with respect to the accuracy of the CSI. A similar conclusion is observed for the zero-forcing (ZF) precoder.

SUMMARY

A method of operating a communication node according to some embodiments includes generating a link adaptation for a downlink transmission to a plurality of user equipments, UEs, using a first power allocation based on first channel state information, generating estimated signal to interference plus noise, SINR, values for the plurality of UEs based on the first power allocation and the link adaptation, obtaining new channel state information for a first UE of the plurality of UEs, wherein the new channel state information is more recent than the first channel state information, generating an updated estimated SINR value for the first UE based on the new channel state information using the first power allocation and the link adaptation, determining a second power allocation for the first UE based on the updated estimated SINR, and transmitting data to the first UE using the link adaptation and the second power allocation.

The method may further include scheduling transmission of data to the first UE after generating the link adaptation.

Determining the second power allocation includes increasing power allocated to the first UE.

The method may further include obtaining new channel state information for a second UE of the plurality of UEs, generating an updated estimated SINR value based on the new channel state information using the first power allocation and the link adaptation for the second UE, and determining a third power allocation for the second UE based on the updated estimated SINR reducing power allocated to the second UE. Determining the third power allocation includes decreasing power allocated to the second UE.

The method may further include allocating zero power to a transmission to at least one other UE based on an updated estimated SINR value for the at least one other UE, and scheduling a retransmission to the at least one other UE for a subsequent transmission time interval.

The method may further include increasing power allocated to the at least one other UE in the retransmission.

The method may further include generating an error value, SINRERROR, for the first UE as a difference between the estimated SINR value for the first UE and the updated estimated SINR value for the first UE, comparing the error value SINRERROR to a threshold, and adjusting power allocated to the first UE based on the comparison.

In some embodiments, adjusting the power allocated to the first UE may include adjusting the power allocated to the first UE in proportion to the error value SINRERROR. In some embodiments, adjusting power allocated to the first UE includes increasing power allocated to the first UE. In some embodiments, adjusting power allocated to the first UE includes decreasing power allocated to the first UE. In some embodiments, adjusting power allocated to the first UE includes setting power allocated to the first UE to zero.

The method may further include scaling power allocated to the plurality of UEs so that a second total power allocation for all of the UEs has a same total power as a first power allocation for all of the UEs after power adjustment.

A method of operating a communication node according to further embodiments includes generating a link adaptation including a first power allocation for a transmission to a plurality of user equipments, UEs, based on first channel estimates for respective communication channels between the communication node and the plurality of UEs, obtaining updated channel estimates for the respective channels, for each respective channel, generating an error term indicative of a difference between an estimated level of signal to interference plus noise, SINR, generated based on the first channel estimates and an estimated level of SINR generated based on the updated channel estimates, adjusting power allocated to the plurality of UEs based on the respective error terms to obtain an adjusted power allocation, and transmitting data to the plurality of UEs using the link adaptation and the adjusted power allocation.

Generating the link adaptation may include generating a precoding matrix for the transmission based on the first power allocation.

The method may further include, for each respective channel, comparing the error term to a threshold, wherein adjusting power allocated to the plurality of UEs is performed in response to the comparison.

The method may further include scaling the adjusted power allocation to maintain a constant total power.

A communication node according to some embodiments is adapted to perform according to any of the foregoing methods.

A communication node according to some embodiments includes a transceiver configured to provide communication with a second communication node over a wireless interface, and a processor coupled with the transceiver, wherein the processor is configured to provide reception/transmission from/to the second communication node through the transceiver. The processor is configured to perform operations according to any of the foregoing methods.

A communication node according to some embodiments includes respective modules adapted to perform according to any of the foregoing methods.

DESCRIPTION OF EMBODIMENTS

There currently exist certain challenges in the approaches described above for MU-MIMO. For example, the approaches to the problem of designing precoders typically assume a certain level of accuracy for the channel state information at the base station and adopt a strategy that best suits the assumed accuracy. A fundamental problem with this approach is that the accuracy of a CSI measurement changes from the moment at which the measurement was made, and this change may or may not be taken into account when designing the precoding vector and performing link adaptation. This problem, which may be referred to as "CSI aging," can be mitigated to some extent by clever pre-coding strategies, such as regularized zero-forcing.

Figure 1:
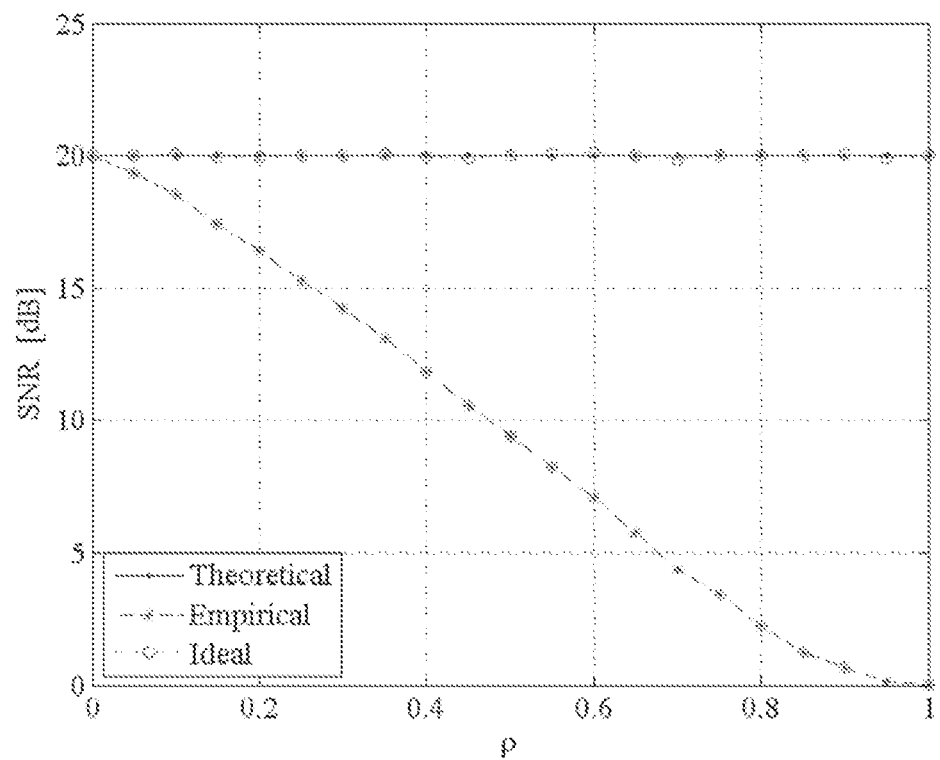
FIG. 1 is a graph illustrating the effect of channel decorrelation on signal to noise ratio.
Figure 2:
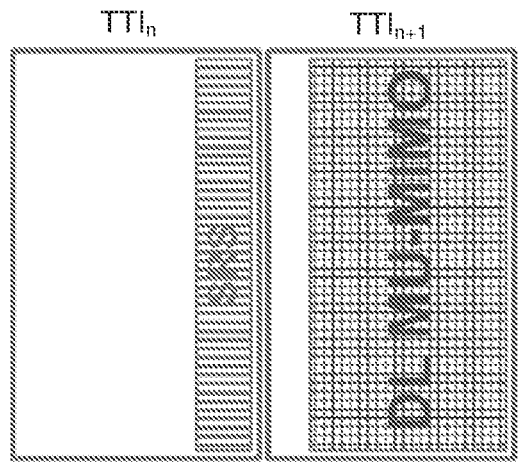
FIG. 2 illustrates transmission of sounding reference signals in a wireless communication system.

However, one straightforward solution to the problem of CSI aging is to use channel state information that is as new as possible. Referring to FIG. 2, it may be desirable to utilize dynamic triggering of SRS transmissions to enable SRS to be transmitted as late before the next TTI as possible. For example, assume a SRS is transmitted in TTI n and it is desired to use the channel information derived from the SRS to perform downlink MU-MIMO in TTI n+1. The problem is that while there may be sufficient time to calculate the precoding vector during the one or two OFDM symbols used for the PDCCH, there may not be sufficient time to perform link adaptation and build transport blocks, etc., using this information before the next TTI occurs. A known strategy is to do this earlier in time, but this then means that the link adaptation decision will be wrong for the DL MU-MIMO transmission, as the link adaptation will have been done using old CSI.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As explained above, in scenarios with a very short time between the transmission of SRS and DL MU-MIMO data transmission while multiplexing many users in the same time/frequency resources, it is necessary to pre-assign the scheduling and link adaptation to enable the transport block to be built. However, this can result in the use of old, and possibly inaccurate, CSI measurements for link adaptation.

Some embodiments of the inventive concepts address this problem by adjusting the power allocation p(i) to each user $UE_i$; that is being scheduled by the BS to combat the error in the link adaptation decision. That is, two SRS measurements are considered. The first SRS measurement, denoted $SRS_{LA}$, is the earlier SRS measurement that was used for link adaptation. The second measurement, denoted $SRS_{NEW}$, is the latest SRS measurement performed after $SRS_{LA}$, and which is assumed to be more accurate than $SRS_{LA}$.

Figure 3:
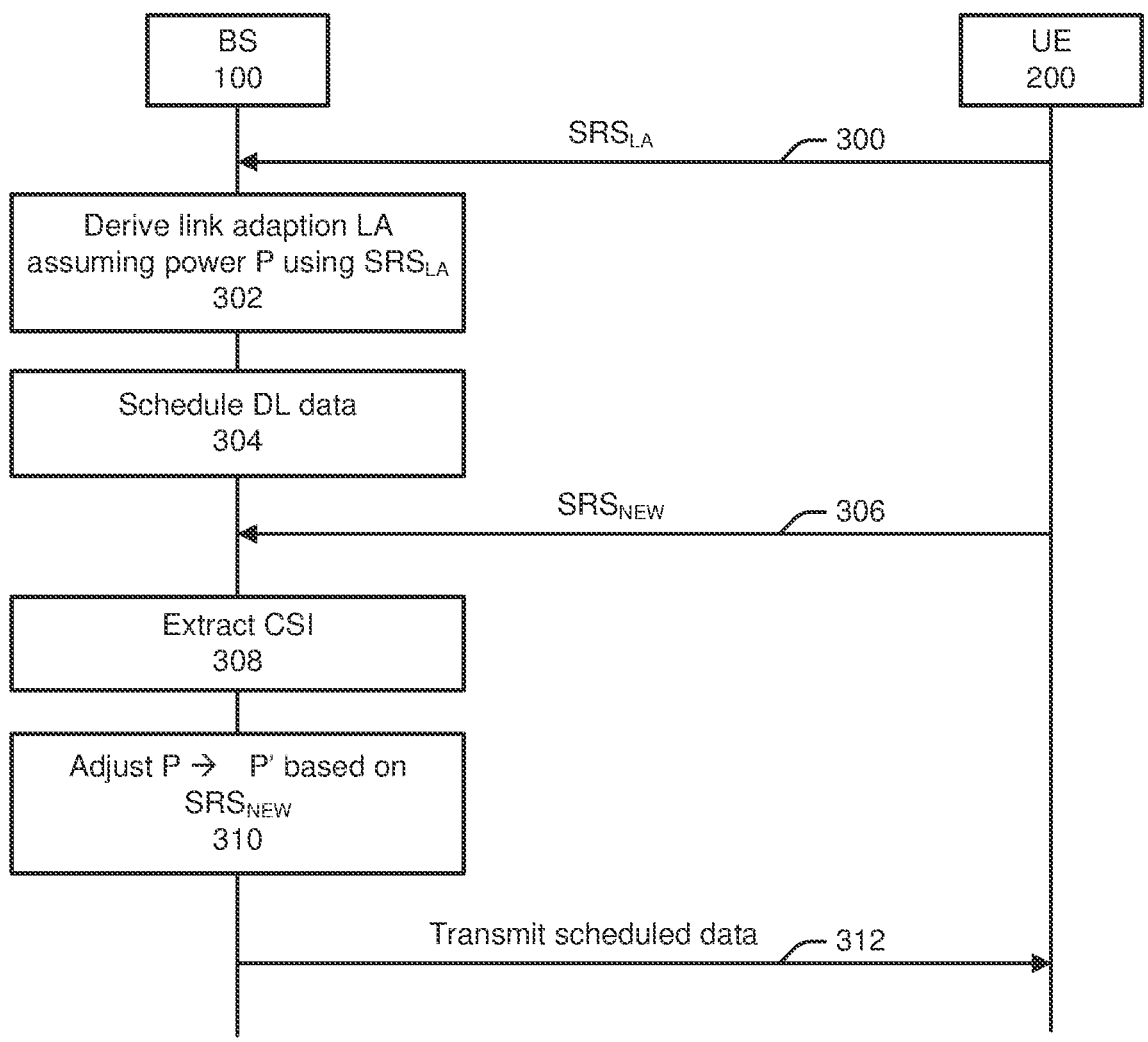
FIG. 3 is a flow diagram that illustrates downlink power adjustment according to some embodiments.
Figure 4:
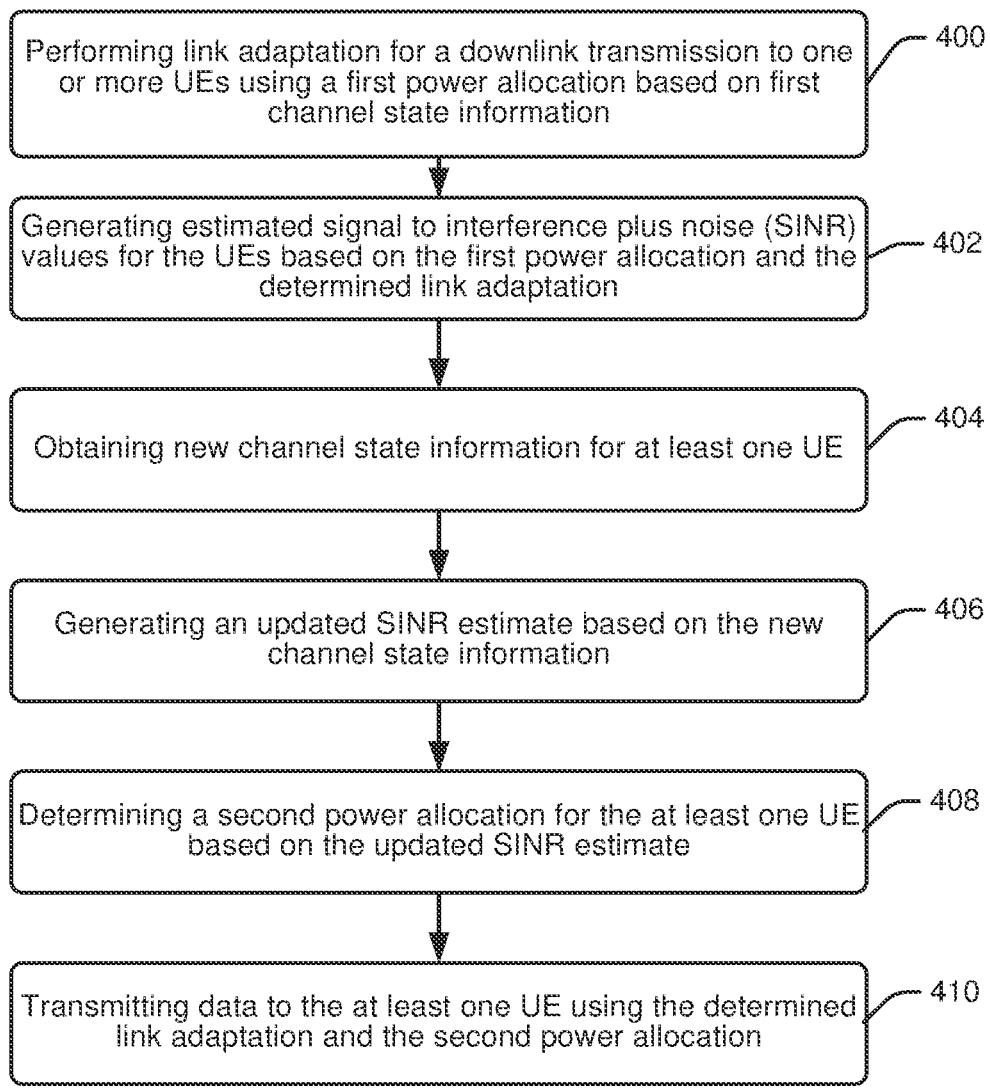
FIGS. 4 and 5 are flowcharts illustrating systems/methods according to some embodiments.

Referring to FIG. 3, a downlink scheduling and transmission process of a base station node according to some embodiments is illustrated. As shown therein, a base station 100 receives a first SRS measurement, denoted $SRS_{LA}$, from a UE 200 that is to be scheduled (arrow 300). Based on the first SRS measurement, the BS 100 derives a link adaptation assuming a nominal power assignment p.

As noted above, deriving the link adaptation involves the calculation of a precoding matrix. To facilitate the calculation/selection of a precoding matrix, the BS generates an estimate of the signal to interference plus noise, SINR, that will be received at the UE based on the first SRS measurement $SRS_{LA}$. The value of SINR calculated based on the first SRS measurement $SRS_{LA}$ is referred to as $SINR_{LA}$. $SINR_{LA}$ is used to evaluate the channel conditions to derive a precoding vector in accordance with any known approach, for example the MRT approach represented by equations [1] and [2].

The SRS allows the BS to estimate the channel H between the BS and a UE, and a SINR estimate can be generated from the estimated channel. For example, for an MMSE receiver, a SINR estimate may be generated from the estimated channel H according to the following equations, where Q is the estimated noise and interference covariance matrix, and P is the chosen precoding matrix:

$$R = (HPP^*H^* + Q) \quad [3.1]$$

$$W = P^*H^*R^{-1} \quad [3.2]$$

$$Q_x = I - WHP + WQW^* \quad [3.3]$$

$$SINR_l(P) = \frac{([WHP]_{l,l})^2}{[Q_x]_{l,l}} \quad [3.4]$$

The sum of the SINR values is a measure of the quality of the precoding matrix over the layers l:

$$q(P) = \Sigma_l SINR_l(P) \quad [3.5]$$

The power used in the transmission is captured by H itself. Accordingly, if there is power difference between the SRS and what is used for the intended data transmission, H is replaced by FH where F is a scaling factor reflecting the power difference.

Note that the formulas also show that SINR depends on the precoding matrix P as well as the noise and interference as reflected in the estimated noise and interference covariance matrix Q. A precoding matrix can thus be determined such that SINR is maximized. It will be noted that the estimated noise and interference covariance matrix Q depends on the precoding matrices used for other UEs. Hence, the selection of a precoding matrix for a particular UE will impact the SINR for other UEs. There are thus a number of factors to consider when selecting a precoding matrix for each of the UEs. Generally speaking, however, the goal of precoding matrix selection is to maximize the SINRs for the collection of UEs with a minimization of interference. It is further noted that assigning less or more power to a particular UE will also affect the channel H (except the one reflecting power difference), where more power will result in increased SINR while less power will reduce SINR.

Referring still to FIG. 3, the BS 100 schedules the downlink data (block 304). Before or after scheduling the downlink data, but after the link adaptation has been determined, the BS 100 receives a new SRS measurement, $SRS_{NEW}$, from the UE 300 (arrow 306). The BS extracts channel state information, CSI, from the new SRS measurement (block 308). The BS 100 then adjusts the transmit power assigned to the UE based on the CSI values obtained from the new SRS measurement $SRS_{NEW}$ (block 310). The BS 100 then transmits the scheduled data to the UE 200 using the adjusted power assignment P' (arrow 312).

To adjust the assigned power level, a calculation of SINR of the transmission is made based on $SRS_{NEW}$, and the result is referred to as $SINR_{NEW}$, respectively.

According to some embodiments, an error term, $SINR_{ERROR}$, is generated that represents a difference between the $SINR_{LA}$ (in dB) used in the link adaptation and the updated estimated $SINR_{NEW}$ based on $SRS_{NEW}$. For user i, $SINR_{ERROR}$ is calculated as follows:

$$SINR_{ERROR}(i)=SINR_{LA}(i)-SINR_{NEW}(i) \qquad [4]$$

Once determined, $SINR_{ERROR}$ is analyzed, and the power allocated to user i, denoted p(i), is adjusted based on the value of $SINR_{ERROR}(i)$. For example, in some embodiments, p(i) may be increased based on $SINR_{ERROR}(i)$ as follows:

$$\text{If } SINR_{ERROR}(i)>0 \rightarrow \text{Increase } p(i) \qquad [5]$$

That is, if the SINR estimate based on the presumably more accurate $SRS_{NEW}$ measurement is smaller than the SINR estimate based on the earlier $SRS_{LA}$ measurement that was actually used for link adaptation for a given user, some embodiments increase power to that user, as it is assumed the channel quality for that user has decreased.

Conversely, in some embodiments, p(i) may be decreased based on $SINR_{ERROR}$ if the SINR estimate based on the more accurate $SRS_{NEW}$ measurement is greater than the SINR estimate based on the earlier $SRS_{LA}$ measurement that was actually used for link adaptation for a given user, indicating that the channel quality for that user has improved:

$$\text{If } SINR_{ERROR}(i)< \rightarrow \text{Decrease } p(i) \qquad [6]$$

In some embodiments, power to a given UE may be decreased if needed to maintain constant total power. In general, however, reducing power if a target SINR is met may be beneficial to help avoid interference.

Furthermore, in some embodiments, there may be a total power constraint, e;g., $p_{max}$, that may not be exceeded. Thus, for example, once a new power allocation p(i) has been determined based on $SINR_{ERROR}$, the power allocation p(i) may be scaled such that the sum of all p(i) does not exceed $p_{max}$.

In some embodiments, power to users may be adjusted based on values of $SINR_{ERROR}$ for each user as described above, and the resulting adjusted power levels may be scaled so that the total transmit power remains the same.

For a good link adaptation algorithm and normal fast-fading conditions, some users UE; will have positive $SINR_{ERROR}(i)$ and some will have negative $SINR_{ERROR}(i)$. Some embodiments redistribute power from users with a good channel to users with a poor channel. With proper precoding, increasing power to one user should not increase interference to other users to any significant extent that causes problems. For precoding and link adaptation, it is presently believed that the interference impact may be ignored. However, in some embodiments, there may be a limit or cap on the amount by which a user's power level is allowed to be increased.

When the link adaptation uses a SINR based on the estimated channel H (including a power allocation p(i)) to determine a transport format, such a determination is typically done such that expected Block-Error Probability (BLEP) is below (or close to) a predetermined target level. If a new channel H' is estimated, a new SINR can be calculated, for example, using equations [3.1] to [3.5] where the channel estimate H is replaced with H' and the precoding matrix P is replaced by P'. Then, a new expected BLEP can be calculated for the determined transport format. If the expected BLEP is above the target level, then a new power allocation p' can be assumed which means that H' will be scaled by p'-p and then the calculations are repeated to see if the expected BLEP is close or below the target. This explains the general principle where processing optimizations can be done so that not all calculations need to be repeated for each iteration of p'. There is a limit on how power can be distributed since the BS has a maximum power. However, with multiple UEs there will in general be some that need more power and some that need less. There may also be examples where only H is replaced, i.e. for cases when there is no time to calculate (and use) a new pre-coder.

Figure 5:
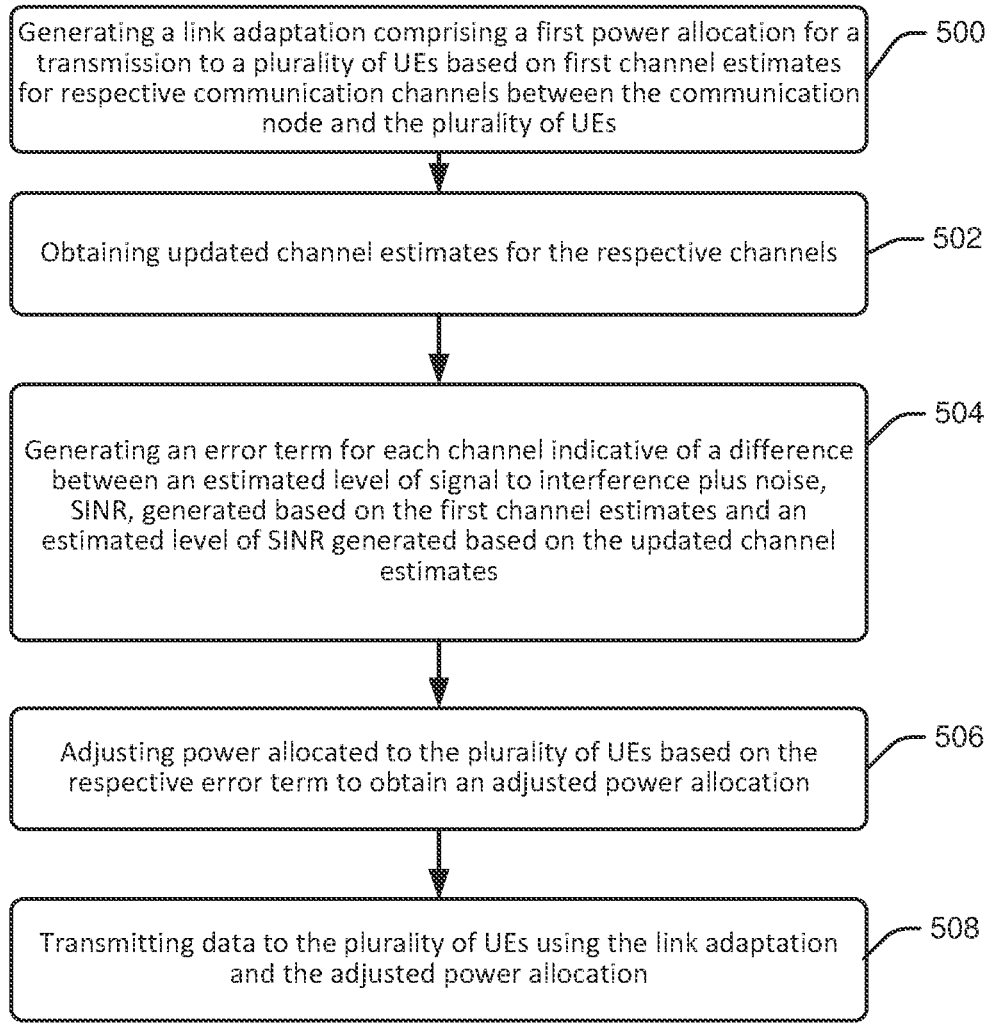

Operations of systems/methods for operating a communication node according to some embodiments are illustrated in FIG. 5. As shown therein, the operations include generating a link adaptation for a downlink transmission to a plurality of UEs using a first power allocation based on first channel state information (block 400). The method then generates estimated signal to interference plus noise, SINR, values for the one or more UEs based on the first power allocation and the link adaptation (block 402). After link adaptation has been performed, new channel state information is obtained for a first UE of the plurality of UEs (block 404). The new channel state information may be obtained, for example, from a SRS provided by the UE, or from CSI provided in a PUCCH transmission. The new channel state information is more recent than the first channel state information.

An updated estimated SINR value is then generated based on the new channel state information using the first power allocation and the link adaptation for the first UE (block 406).

The method then determines a second power allocation for the first UE based on the updated estimated SINR (block 408). Finally, the communication node transmits data to the first UE using the link adaptation and second power allocation (block 410).

Operations of systems/methods for operating a communication node according to further embodiments are illustrated in FIG. 5. As shown therein, the operations include generating a link adaptation comprising a first power allocation for a transmission to a plurality of UEs based on first channel estimates for respective communication channels between the communication node and the plurality of UEs (block 500), and obtaining updated channel estimates for the respective channels (block 502). For each respective channel, an error term is generated that is indicative of a difference between an estimated level of signal to interference plus noise, SINR, generated based on the first channel estimates and an estimated level of SINR generated based on the updated channel estimates (block 504). The systems/methods then adjust power allocated to the plurality of UEs based on the respective error terms to obtain an adjusted power allocation (block 506), and transmit data to the plurality of UEs using the link adaptation and the adjusted power allocation (block 508).

Certain embodiments may provide one or more technical advantage(s). Because power can be adjusted on a UE-by-UE basis after link adaptation is performed, this approach may enable the use of very recent SRS signals and corresponding accurate CSI to adapt a MU-MIMO transmission, which can result in more reliable and/or higher throughput MU-MIMO transmission.

In particular, some embodiments can be used for increasing system throughput by enabling lower latency between SRS and data transmission while keeping link adaptation errors low. These embodiments may impose only minor additional computational complexity, as they require only a direct power adjustment.

Some embodiments can be used in scenarios in which the accuracy of the link adaptation information is different for different users due the fact that a link adaptation decision was made using old CSI. These embodiments may redistribute power based on newer, more accurate CSI measurements, while retaining the link adaptation based on the older CSI measurements to thereby reduce link adaptation error due to the use of older CSI.

Some users with high SINR may not benefit from the high SINR due to the amount of DL data assigned to them. Thus, "stealing" power from those users may cost little and can save other users from suffering failed transmission and/or from having to perform unnecessary retransmissions.

Scaling of Power Levels

As noted above, in some embodiments, power levels $p(i)$ allocated to $i$ users may be adjusted based on values of $SINR_{ERROR}(i)$, and the resulting power levels may be scaled to ensure that the total transmit power, that is, $\Sigma_i p_i$, remains the same. For example, assume that $p_{0,i}$ represents the original power levels and $p_{1,i}$ represents the power levels after they have been adjusted based on $SINR_{ERROR}(i)$ as described above. The total power as originally set is equal to $p_{0,tot}=\Sigma_i p_{0,i}$, and the total power after adjustment is $p_{1,tot}=\Sigma_i p_{1,i}$. The values of $p_{1,i}$ may be scaled by a constant $k$ equal to $$\frac{P_{0,tot}}{P_{1,tot}},$$

so that the total transmitted power remains the same as follows:

$$k = \frac{P_{0,tot}}{P_{1,tot}} \quad [7]$$

$$\hat{p}_{1,i} = kp_{1,i} \quad [8]$$

Then, the total transmitted power remains the same after the adjustment:

$$\Sigma_i \hat{p}_{1,i} = \Sigma_i p_{0,i} \quad [9]$$

In practice, some issues may arise when considering a general MU-MIMO scenario. Some of these issues are discussed below.

Insufficient Total Power to Combat General SINR Decrease

In some scenarios the total power budget can be insufficient to combat the errors in the link adaptation. In that case, the total link adaptation power budget may be increased by allowing one or more retransmissions for one or more users. That is, a retransmission may be initiated without waiting for the receiver to notify the BS that the initial transmission failed. Such a decision may be based on traffic type, SINR level, or other considerations.

In addition, the power may be adjusted to increase the possibility of successful transmission after one or more retransmissions. This may be beneficial for Ultra Reliable Low Latency Communications (URLLC) where latency requirements limit the number of transmission attempts can be performed within the latency budget.

For example, considering one retransmission, a 3 dB adjustment can be applied to some users $i$:

$$SINR_{ERROR}(i)=SINR_{LA}(i)-SINR_{NEW}(i) \quad [10]$$

$$\text{If } SINR_{ERROR}(i)>3 \rightarrow \text{Increase } p(i) \quad [11]$$

$$\text{If } SINR_{ERROR}(i)<3 \rightarrow \text{Decrease } p(i) \quad [12]$$

In some cases, there may be several UEs requiring large increases to give the target BLEP. However, there may not be enough power available to allocate what is needed for each of the UEs. In that case, the power distribution can be formulated such that current transmissions will occur with a BLEP higher than the target, but power is increased such that each UE will only require one additional transmission to enable successful reception with high probability. If power would be increased to some of the UEs, the other UEs could potentially need two retransmissions ensure successful reception with high probability.

Retransmissions increase delay, which can have negative impact on TCP throughput, especially for high data rate users. Retransmissions may in some embodiments be applied first to users having low to medium data rates where the increased latency due to an extra re-transmission is less visible. On the other hand, for high data rate users and/or URLLC (Ultra Low Latency High Reliability Communication) users, extra retransmissions are preferably avoided.

In some embodiments, a user that has much worse SINR than predicted may be dropped if the error is above some positive threshold THR. That is, the power level of the user may be set to zero:

$$\text{If } SINR_{ERROR}(I)>THR \rightarrow \text{Set } p(i)=0 \quad [13]$$

Figure 6:
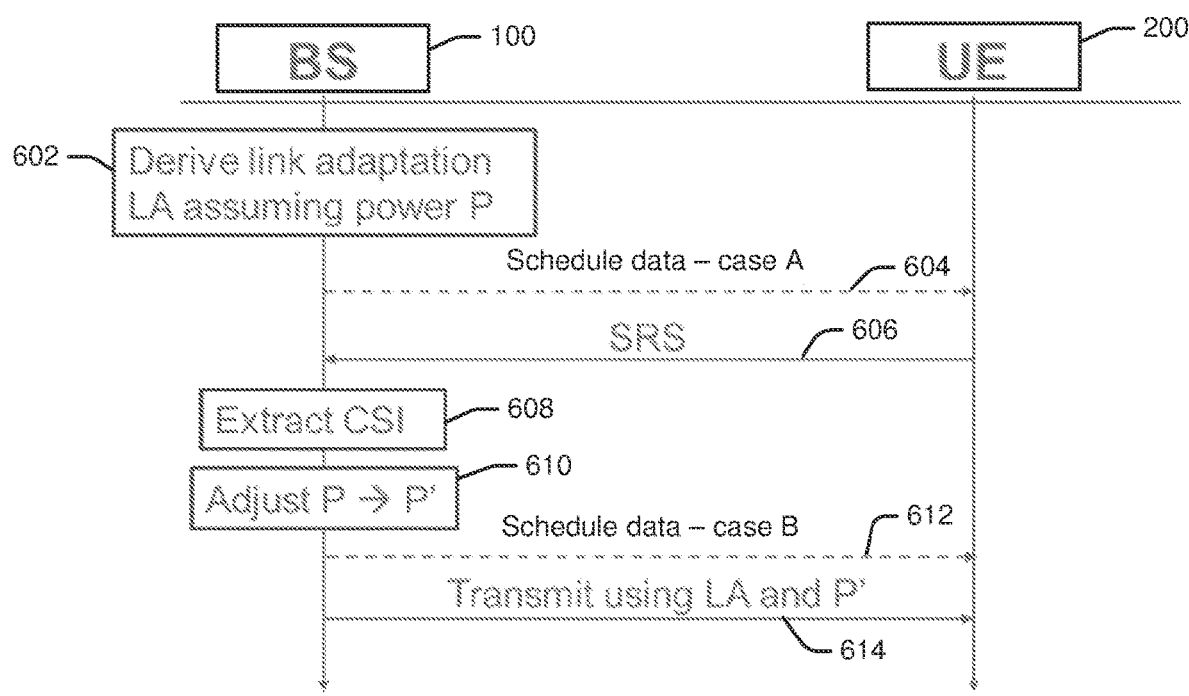
FIG. 6 is a flow diagram that illustrates downlink power adjustment according to some embodiments.

Retransmission after setting the transmission power to zero in the first transmission is illustrated in FIG. 6. As shown therein, a base station BS derives a link adaptation for a DL transmission to a user equipment US (block 602). In one example (Case A), data is scheduled on the downlink using the derived link adaptation (arrow 604) immediately after the link adaptation is derived. An SRS is then received from the UE (arrow 606). The BS extracts CSI from the SRS (block 608) and uses the new CSI to adjust the power assignment (block 610). Because in Case A the power adjustment is performed after scheduling, the BS may simply set the power allocated to a given UE to zero to force retransmission. The BS then transmits the scheduled data using the previous link adaptation and the new power allocation p'.

Alternatively, the BS may not schedule the transmission until after the SRS is received and power is adjusted (Case B). In that case, rather than setting a UE's allocated power to zero, the BS can simply remove the UE from the schedule.

Observe that for both scheduling alternatives the link adaptation used is derived prior to the time the CSI information is obtained from the SRS transmission.

As noted above, in Case A, the UE will try to decode the data but will fail, since no transmission has happened. To avoid a situation in which a UE may try to soft-combine a future true transmission with the (wrong) soft values obtained from the cancelled transmission, the e/gNB should, in the re-transmission, either indicate that the current transmission is a new transmission or signal that the first transmission has been preempted using the preemption indicator.

Sub-Assignment of Total Power for Additional Reliability

In some embodiments, the power allocation in the link adaptation is set so that only a fraction of the total power is assigned. This may provide headroom for adjustment after receiving the SRS. That is, the total power after adjustment may be increased relative to the total power before adjustment. This approach can useful if the transmissions must be very reliable and as such it is not desirable to drop users or add retransmissions.

Using Reported CSI

Some embodiments of the inventive concepts may also be used when the CSI is reported very late using, such as may occur when a PUCCH transmission containing CQI is received by the BS. Apart from the source of CSI being a report, the embodiments would operate in a similar manner as discussed above. That is, values of $SINR_{ERROR}$ may be generated for each UE and power to individual UEs may be adjusted accordingly.

No Power Adjustment on Data DMRS

In some embodiments, a data demodulation reference signal (DMRS) is transmitted in an OFDM symbol before the data. In such embodiments, one additional OFDM symbol can be gained in the time budget by transmitting the data DMRS with an assumed power allocation p, while data is transmitted with the adjusted power allocation p'. With a limited number of adjustment steps, the UE may perform a qualitative guess of which power offset between DMRS and data should be assumed. The UE may compare the average power over the data symbols with average power of the DMRS symbols and may, from the knowledge of which modulation scheme is used, deduce which power it may assume. A more tedious method would be to perform a decoding attempt for each possible adjustment.

Interference Limitation on Power Adjustment

In some embodiments, users that cause high interference may not assigned additional power, as this may increase the interference to other users. Rather, the retransmission strategy described above may be used for users causing high interference or that are likely to cause high interference to other users. In extreme cases, such users can be dropped as described above, i.e. transmit power for such users is set to zero. In some embodiments, the users affected by high interference may be dropped in the same manner if the user causing the high interference is prioritized.

Figure 7:
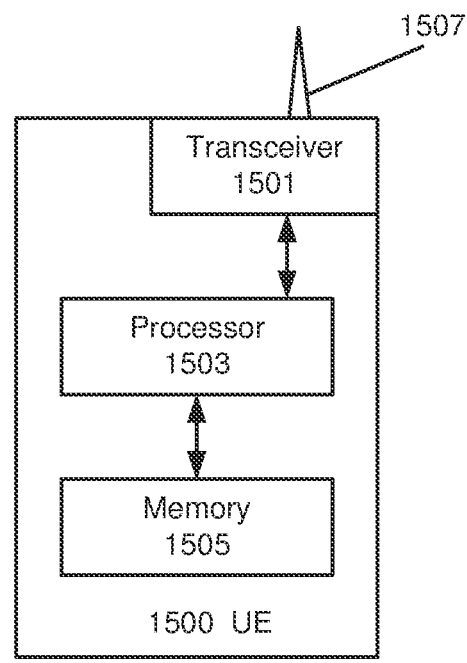
FIG. 7 is a block diagram of a user equipment according to some embodiments.

Example Elements of UE and Network Node:

FIG. 7 is a block diagram illustrating elements of a UE 1500 (also referred to as a wireless terminal, a wireless communication device, a wireless communication terminal, user equipment, a user equipment node/terminal/device, etc.) configured to operate according to embodiments disclosed herein. As shown, the UE 1500 may include at least one antenna 1507 (also referred to as antenna), and at least one transceiver circuit 1501 (also referred to as transceiver) including a transmitter and a receiver configured to provide uplink and downlink radio communications with a base station or other radio transceiver element of a radio access network. The UE 1500 may also include at least one processor circuit 1503 (also referred to as processor) coupled to the transceiver 1501, and at least one memory circuit 1505 (also referred to as memory) coupled to the processor 1503. The memory 1505 may include computer readable program code that when executed by the processor 1503 causes the processor 1503 to perform operations according to embodiments disclosed herein for a UE. According to other embodiments, processor 1503 may be defined to include memory so that a separate memory circuit is not required. The UE 1500 may also include an interface (such as a user interface) coupled with processor 1503.

As discussed herein, operations of the UE 1500 may be performed by processor 1503 and/or transceiver 1501. Alternatively, or additionally, the UE 1500 may include modules, e.g., software and/or circuitry, that performs respective operations (e.g., operations discussed herein with respect to example embodiments of UEs).

Figure 8:
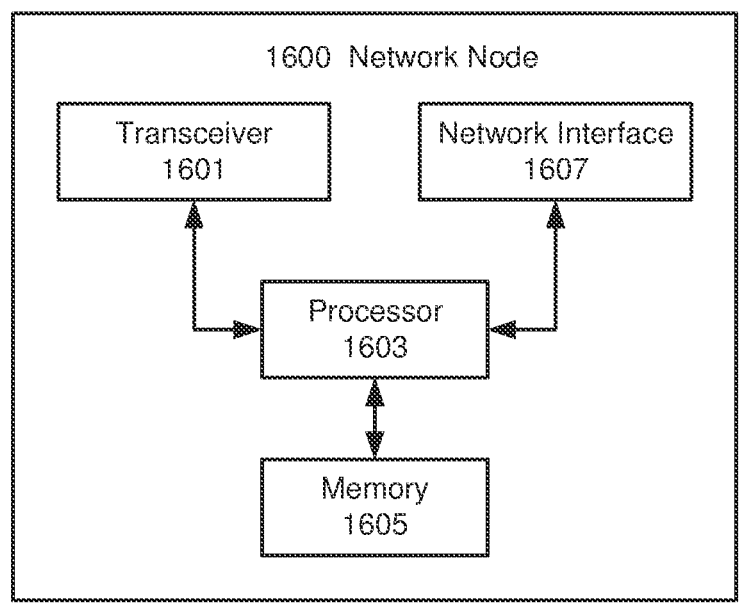
FIG. 8 is a block diagram of a network node according to some embodiments.

FIG. 8 is a block diagram illustrating elements of a network node 1600 according to one or more embodiments disclosed herein. As shown, the network node 1600 may include at least one transceiver circuit 1601 (also referred to as a transceiver) including a transmitter and a receiver configured to provide uplink and downlink radio communications with UEs. The network node 1600 may include at least one network interface circuit 1607 (also referred to as a network interface) configured to provide communications with other network nodes, such as one or more nodes of a radio access network, a core network, and/or another system node. The network node 1600 may also include at least one processor circuit 1603 (also referred to as a processor) coupled to the transceiver 1601, and at least one memory circuit 1605 (also referred to as memory) coupled to the processor 1603. The memory 1605 may include computer readable program code that when executed by the processor 1605 causes the processor 1605 to perform operations according to embodiments disclosed herein for a network node. According to other embodiments, processor 1603 may be defined to include memory so that a separate memory circuit is not required.

As discussed herein, operations of the network node may be performed by processor 1603, network interface 1607, and/or transceiver 1601. For example, processor 1603 may control transceiver 1601 to transmit communications through transceiver 1601 over a radio interface to one or more UEs and/or to receive communications through transceiver 1601 from one or more UEs over a radio interface. Similarly, processor 1603 may control network interface 1607 to send communications through network interface 1607 to one or more other network nodes and/or other system nodes, and/or to receive communications through network interface 1607 from one or more other network nodes and/or other system nodes. Alternatively, or additionally, the network node 1600 may include modules, e.g., circuitry, that performs respective operations (e.g., operations discussed herein with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

FURTHER DEFINITIONS AND EMBODIMENTS

In this disclosure, a receiving node and a transmitting node are referred to. In the embodiments in one example the transmitting node can be a UE and the receiving node can be a network node. In another example the transmitting node can be a network node and the receiving node can be a UE. In yet another example the transmitting and receiving node can be involved in direct device to device communication, that is both can be considered UEs. Examples of device to device communication are proximity service (ProSe), ProSe direct discovery, ProSe direct communication, V2X (where X can denote V, I or P e.g. V2V, V2I, V2P etc) etc.

A network node is a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC) etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term signal used herein can be any physical signal or physical channel. Examples of downlink physical signals are reference signal such as PSS, SSS, CRS, PRS, CSI-RS, DMRS, NRS, NPSS, NSSS, SS, MBSFN RS etc. Examples of uplink physical signals are reference signal such as SRS, DMRS etc. The term physical channel (e.g., in the context of channel reception) used herein is also called as 'channel. The physical channel carries higher layer information (e.g. RRC, logical control channel etc). Examples of downlink physical channels are PBCH, NPBCH, PDCCH, PDSCH, sPDSCH, MPDCCH, NPDCCH, NPDSCH, E-PDCCH etc. Examples of uplink physical channels are sPUCCH. sPUSCH, PUSCH, PUCCH, NPUSCH, PRACH, NPRACH etc.

The term time resource used herein may correspond to any type of physical resource or radio resource expressed in terms of length of time and/or frequency. Signals are transmitted or received by a radio node over a time resource. Examples of time resources are: symbol, time slot, subframe, radio frame, TTI, interleaving time, etc.

Figure 9:
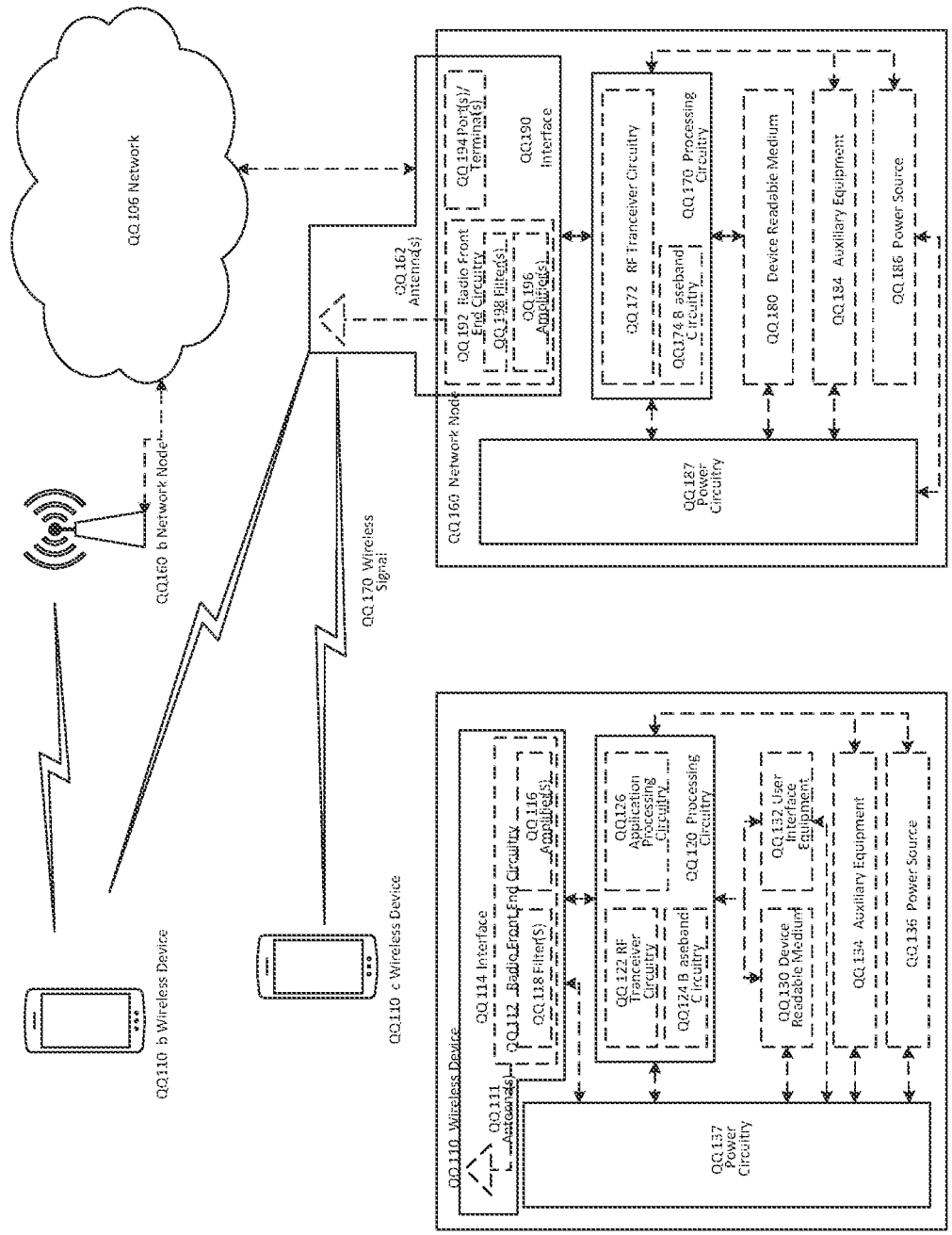
FIG. 9 is a block diagram of a wireless communication system according to some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
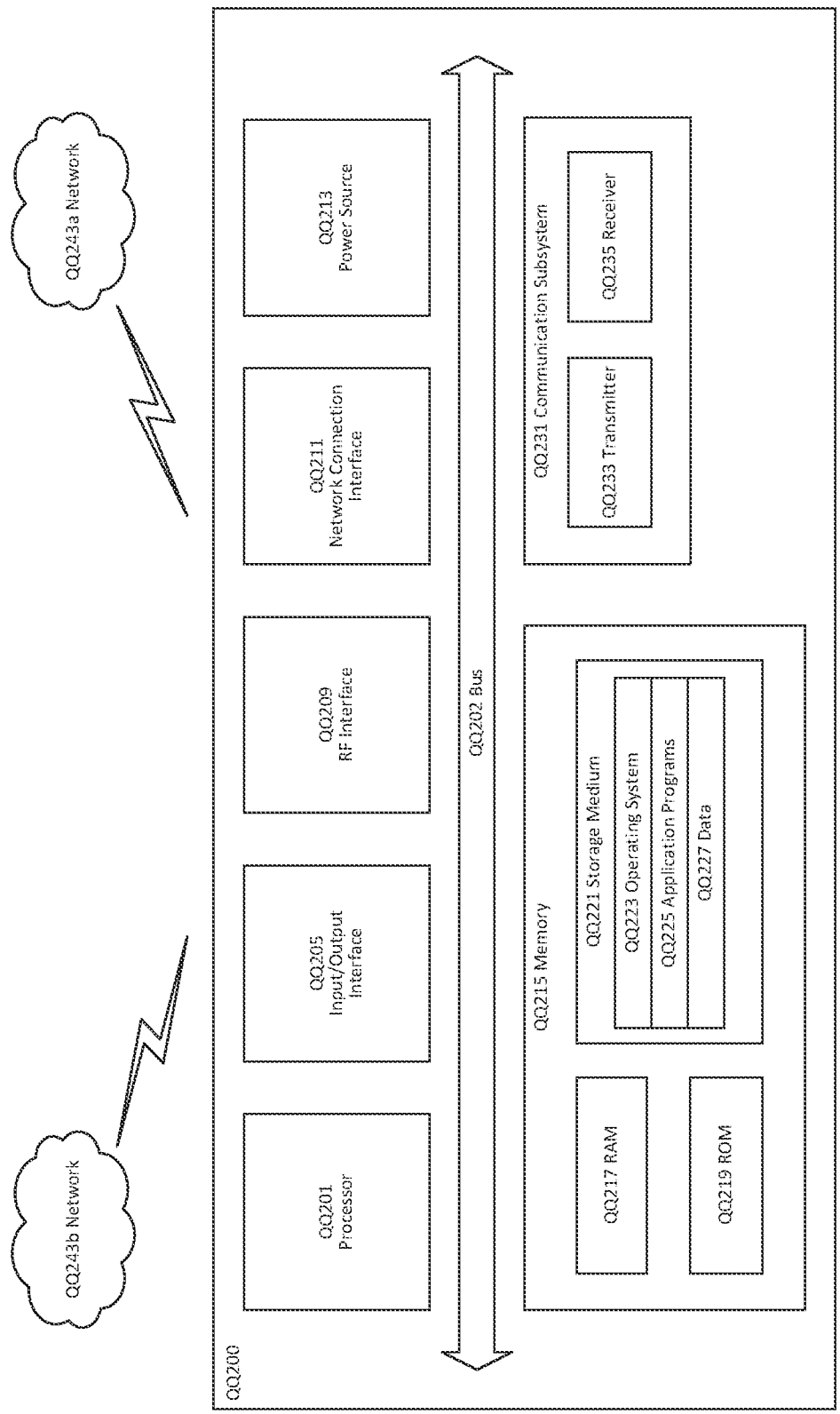
FIG. 10 is a block diagram of a UE according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 10, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 11:
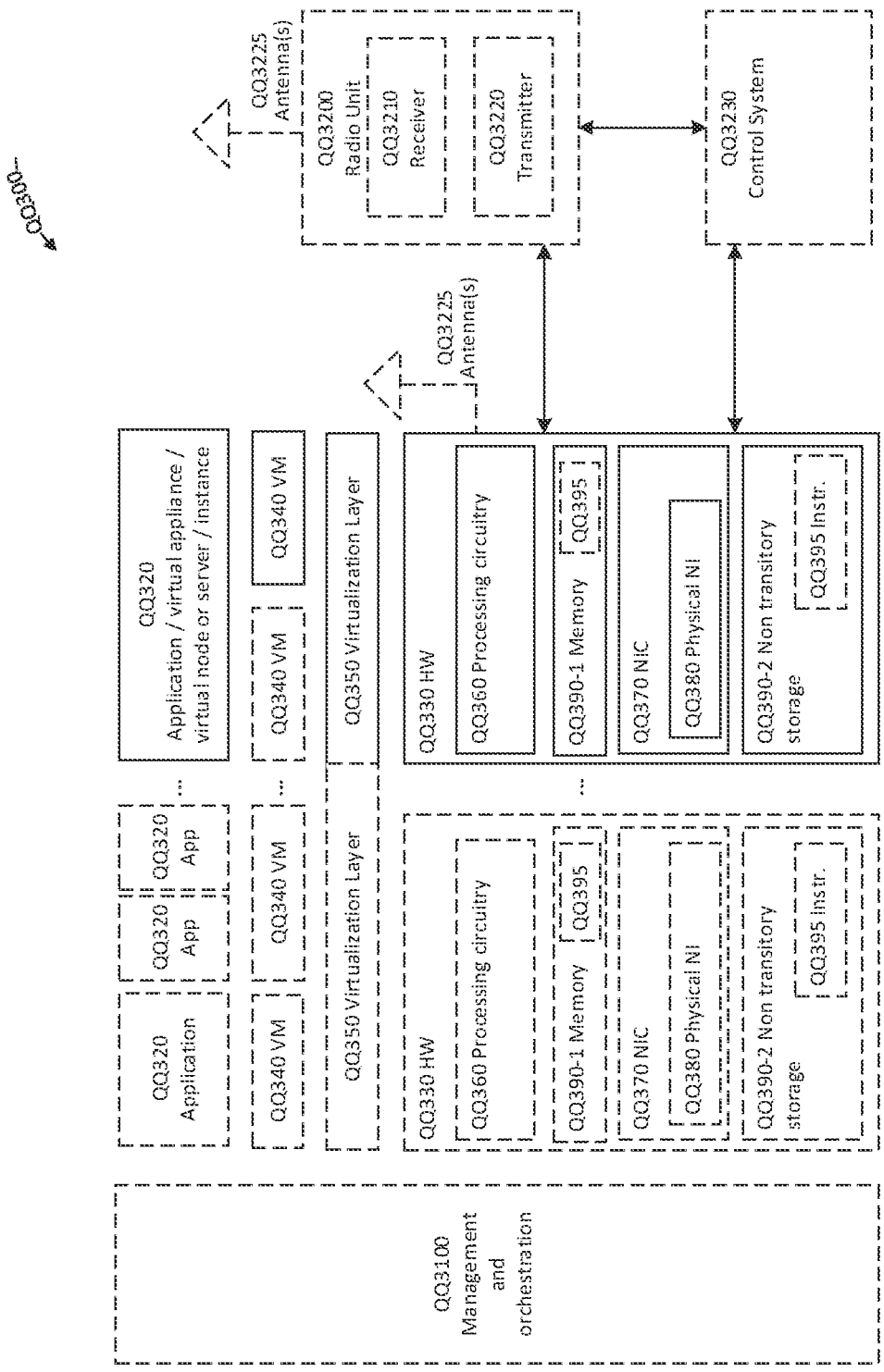
FIG. 11 is a schematic block diagram illustrating a virtualization environment according to some embodiments.

FIG. 11 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 11, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 11.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 12:
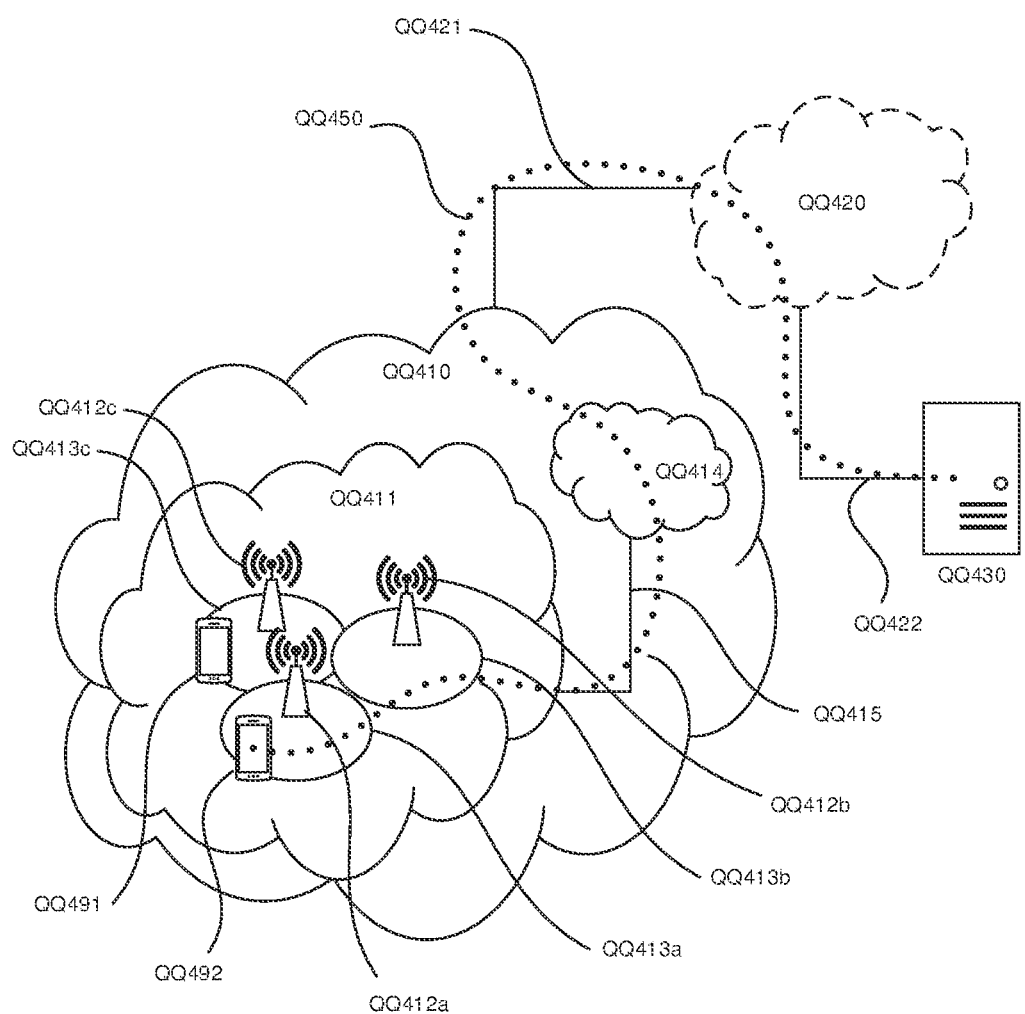
FIG. 12 is a block diagram of a communication system according to some embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 13:
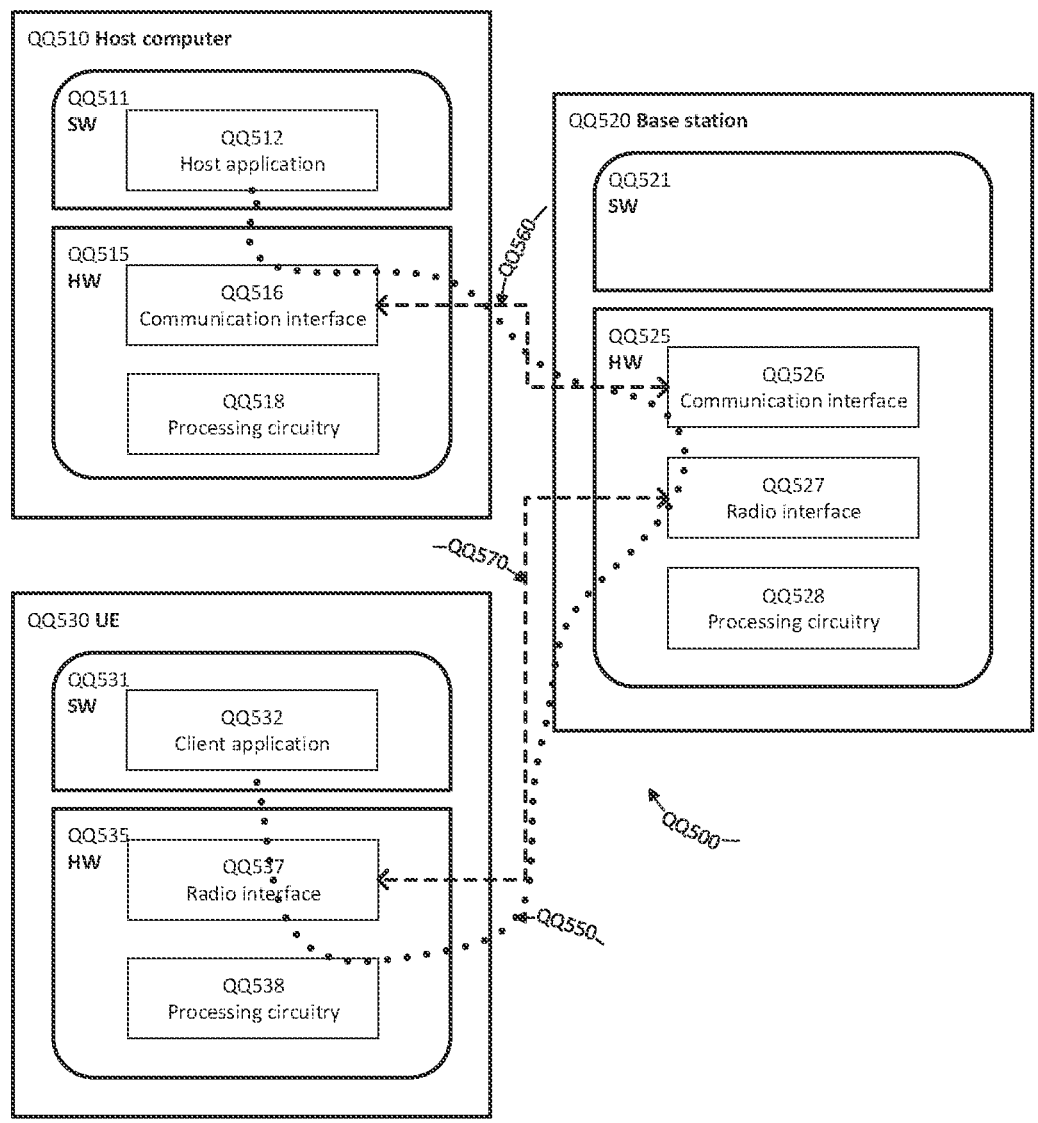
FIG. 13 is a block diagram of a communication system according to some embodiments.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
BLEP Block Error Probability
BS Base Station
CRS Common reference signal
CSI Channel state information
CSI-RS Channel state information reference signal
DCI Downlink Control Information
DL Downlink
DM RS Demodulation reference signal
MIMO Multiple-input-multiple-output
MRC Maximum-ratio combining
MRT Maximum-ratio transmission
MU-MIMO Multiuser multiple-input-multiple-output
NR New Radio
PDCCH Physical Downlink Control Channel
PUCCH Physical Uplink Control Channel
SINR Signal-to-interference-plus-noise ratio
SNR Signal-to-noise-ratio
SVD Singular-value decomposition
TTI Transmission Time Interval
UL Uplink
URLLC Ultra Reliable Low Latency Communications
VL-MIMO Very-large multiple-input-multiple-output
ZF Zero Forcing

What is claimed is:

1. A method of operating a communication node, the method comprising:
generating a link adaptation for a downlink transmission to a plurality of user equipments (UEs) using a first power allocation based on first channel state information;
generating estimated signal to interference plus noise (SINR) values for the plurality of UEs based on the first power allocation and the link adaptation;
obtaining new channel state information for a first UE of the plurality of UEs, wherein the new channel state information is more recent than the first channel state information;
generating an updated estimated SINR value for the first UE based on the new channel state information using the first power allocation and the link adaptation;
determining a second power allocation for the first UE based on the updated estimated SINR; and
transmitting data to the first UE using the link adaptation and the second power allocation.

2. The method of claim 1, further comprising:
scheduling transmission of data to the first UE after generating the link adaptation.

3. The method of claim 1, wherein determining the second power allocation comprises increasing power allocated to the first UE.

4. The method of claim 3, further comprising:
obtaining new channel state information for a second UE of the plurality of UEs;
generating an updated estimated SINR value based on the new channel state information using the first power allocation and the link adaptation for the second UE; and determining a third power allocation for the second UE based on the updated estimated SINR reducing power allocated to the second UE;
wherein determining the third power allocation comprises decreasing power allocated to the second UE.

5. The method of claim 1, further comprising:
allocating zero power to a transmission to at least one other UE based on an updated estimated SINR value for the at least one other UE; and
scheduling a retransmission to the at least one other UE for a subsequent transmission time interval.

6. The method of claim 5, further comprising:
increasing power allocated to the at least one other UE in the retransmission.

7. The method of claim 1, further comprising:
generating an error value ($SINR_{ERROR}$) for the first UE as a difference between the estimated SINR value for the first UE and the updated estimated SINR value for the first UE;
comparing $SINR_{ERROR}$ to a threshold; and
adjusting power allocated to the first UE based on the comparison.

8. The method of claim 7, wherein adjusting the power allocated to the first UE comprises adjusting the power allocated to the first UE in proportion to $SINR_{ERROR}$.

9. The method of claim 7, wherein adjusting power allocated to the first UE comprises increasing power allocated to the first UE.

10. The method of claim 7, wherein adjusting power allocated to the first UE comprises decreasing power allocated to the first UE.

11. The method of claim 7, wherein adjusting power allocated to the first UE comprises setting power allocated to the first UE to zero.

12. The method of claim 1, further comprising:
scaling power allocated to the plurality of UEs so that a second total power allocation for all of the UEs has a same total power as a first power allocation for all of the UEs after power adjustment.

13. A communication node comprising:
a transceiver configured to provide communication with a second communication node over a wireless interface; and
a processor coupled with the transceiver, wherein the communication node is configured to:
generate a link adaptation for a downlink transmission to a plurality of user equipments (UEs) using a first power allocation based on first channel state information;
generate estimated signal to interference plus noise (SINR) values for the plurality of UEs based on the first power allocation and the link adaptation;
obtain new channel state information for a first UE of the plurality of UEs, wherein the new channel state information is more recent than the first channel state information;
generate an updated estimated SINR value for the first UE based on the new channel state information using the first power allocation and the link adaptation;
determine a second power allocation for the first UE based on the updated estimated SINR; and
transmit data to the first UE using the link adaptation and the second power allocation.

14. A method of operating a communication node, the method comprising:
generating a link adaptation comprising a first power allocation for a transmission to a plurality of user equipments (UEs) based on first channel estimates for respective communication channels between the communication node and the plurality of UEs;
obtaining updated channel estimates for the respective channels;
for each respective channel, generating an error term indicative of a difference between an estimated level of signal to interference plus noise (SINR) generated based on the first channel estimates and an estimated level of SINR generated based on the updated channel estimates;
adjusting power allocated to the plurality of UEs based on the respective error terms to obtain an adjusted power allocation; and
transmitting data to the plurality of UEs using the link adaptation and the adjusted power allocation.

15. The method of claim 14, wherein generating the link adaptation comprises generating a precoding matrix for the transmission based on the first power allocation.

16. The method of claim 14, further comprising:
for each respective channel, comparing the error term to a threshold;
wherein adjusting power allocated to the plurality of UEs is performed in response to the comparison.

17. The method of claim 14, further comprising:
scaling the adjusted power allocation to maintain a constant total power.

18. A communication node comprising:
a transceiver configured to provide communication with a second communication node over a wireless interface; and
a processor coupled with the transceiver, wherein the communication node is configured to:
generate a link adaptation comprising a first power allocation for a transmission to a plurality of user equipments (UEs) based on first channel estimates for respective communication channels between the communication node and the plurality of UEs;
obtain updated channel estimates for the respective channels;
for each respective channel, generate an error term indicative of a difference between an estimated level of signal to interference plus noise (SINR) generated based on the first channel estimates and an estimated level of SINR generated based on the updated channel estimates;
adjust power allocated to the plurality of UEs based on the respective error terms to obtain an adjusted power allocation; and
transmit data to the plurality of UEs using the link adaptation and the adjusted power allocation.

* * * * *